July 16, 1940. S. R. OGILBY 2,207,815
MANUFACTURE OF A PLURALITY OF SIMILARLY SHAPED ARTICLES
Filed Sept. 17, 1938

INVENTOR.
STEWART R. OGILBY
BY Gourley & Budlong
ATTORNEYS

Patented July 16, 1940

2,207,815

UNITED STATES PATENT OFFICE 2,207,815

MANUFACTURE OF A PLURALITY OF SIMILARLY SHAPED ARTICLES

Stewart R. Ogilby, Staten Island, N. Y., assignor, by mesne assignments, to United States Rubber Company, New York, N. Y., a corporation of New Jersey Application September 17, 1938, Serial No. 230,409

12 Claims. (Cl. 18—58)

This invention relates to the manufacture of a plurality of similarly shaped rubber articles and particularly to methods for producing a plurality of separable superimposed rubber articles of similar shape on the same form or deposition surface.

It is common practice to deposit rubber by one or more applications from a rubber-containing liquid onto a deposition surface of the desired shape to form a single article of the desired thickness, and after drying of the article to remove it from the surface, after which it may be subjected to further treatment, such as vulcanization, if desired. Examples of this practice are the production of gloves and balloons, in which a rubber film is deposited from a rubber-containing liquid onto glove forms or balloon forms, as by dipping the form in the rubber-containing liquid such as an organic solvent solution of rubber or an aqueous dispersion of rubber such as latex. The deposition of the rubber solids from the rubber-containing liquid is accomplished by drying, coagulation or the like, and the deposited film is then removed as a complete article. Rubber sheeting is also made by spreading or spraying a rubber-containing liquid such as latex on to a flat deposition backing, depositing the rubber from the latex by coagulation and/or drying and removing the finished film from the backing. In producing rubber films, sheets, or articles in accordance with this procedure, only one article has been formed at a time, thus requiring a separate form for the production of each article. Furthermore all the articles produced on the same form were of the same size and shape, although the thickness could be controlled as desired as by dipping the form into the latex for the desired length of time, or by a series of dips which produce laminae which adhere to each other. Upon the deposition of a single rubber article the practice was to strip the article from the form, and, if desired, to clean the form, and then to repeat the process for the production of a similar or identical article.

The present invention provides methods for making a plurality of similarly shaped articles of progressively increasing size on the same form. The articles are superimposed and are separable from each other, the inner articles remaining on the form while the desired number of outer articles are being produced. Considerably fewer forms are necessary in practicing the present invention, since a single form suffices for the production of a number of articles within a relatively short period of time. Substantial decrease in the cost of the articles is accomplished by a saving in time and also by reduction of the necessary number of forms. The invention also has the advantage of the formation of differently sized articles within reasonable limits without the necessity for using forms which correspond exactly to the interior dimensions of the articles.

In carrying out the invention, a film of rubber is deposited from a rubber-containing liquid, such as latex or a rubber cement, onto a deposition surface, which may comprise a form or a mold, and the process is continued by superimposing the desired number of rubber articles in the same manner upon the first article, and rendering the surfaces of each article easily separable from the surfaces adjacent to them. Upon the deposition of the desired number of rubber films or separate articles on the deposition surface or form, the films or articles are removed from the form and from each other. The separability of the rubber articles from each other may be accomplished in any of a number of ways, as by treating the surfaces thereof with agents which will render them non-adherent to rubber subsequently deposited thereon from rubber-containing compositions, or by providing a thin film or coating of finely divided essentially water insoluble material between the surfaces of adjacent articles to produce the same effect. The formation of each rubber film or article from the rubber-containing liquid may be effected in any well known or desired manner, as by depositing an aqueous dispersion or solution of rubber onto the deposition surface and onto the previously formed rubber films by dipping, spraying, or spreading. The rubber solids in the latex or other rubber-containing liquid may then be deposited or solidified to form a film, as by coagulating and/or drying. Once the desired number of separable articles have been built up on the surface of the form in accordance with the procedure of this invention, they may be easily removed therefrom and from each other.

In the drawing certain exemplary embodiments of the invention are illustrated, in which.

Figure 1:
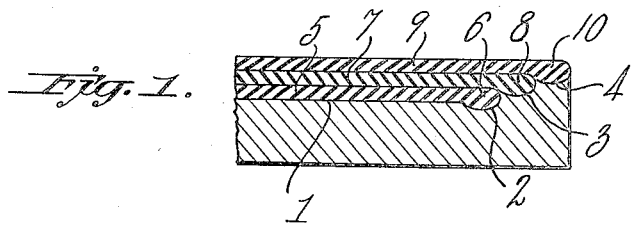
Figure 1 is an enlarged cross-sectional view of a reinforcement-producing deposition surface with rubber films deposited thereon.

As an example of the production of a plurality of removable rubber articles from latex on a deposition form according to the present invention, the following procedure may be conveniently practiced, although it is to be understood that this particular procedure may be varied within extremely wide limits. A form corresponding to the desired shape of the final articles may be dipped into a coagulant bath which may conveniently comprise 3.75 grams of bromine and 4.5 grams of potassium bromide dissolved in 300 ccs. of a 25% aqueous solution of acetic acid. The form is withdrawn from the coagulant bath and is then dipped into a conventional latex compound and allowed to remain there until a deposit of the desired thickness has been built up, after which it is withdrawn from the latex bath. The acetic acid coagulates the rubber solids of the latex upon the form, and the halogenating agent, that is, the bromine, provides the inner surface of the deposited rubber film or article with a non-tacky finish when the rubber film is dry. This halogenating treatment renders the surface of the rubber film or article easily removable from the form. The process is then repeated to build up a second rubber article over the surface of the first while the first article still remains on the form. Thus, the form surrounded by the first article is again dipped into the coagulant solution containing the halogenating agent, withdrawn therefrom, and redipped for the desired period of time into the latex composition, whereupon it is withdrawn and dried. These steps are repeated the desired number of times, forming a succession of superimposed rubber articles, all of which are easily removable from each other, and each of which is progressively of larger size than the deposited article immediately preceding it. When the final rubber article has been dried, all the articles may be stripped from the form, and from each other, the stripping operations being accomplished in the desired order. For example, if extremely thin articles have been produced, it may be preferable first to strip all the articles as a unit from the form and then to remove them from each other; or the outer article may be removed first, and then the inner articles consecutively removed.

The above cited example may be varied as desired, with respect to the proportions, compositions, and order of procedure. Instead of brominating the surface of the articles, they may be otherwise halogenated by treatment with chlorine or iodine, for example by an 8% solution of saturated chlorine water, or a 15% solution of saturated iodine water, or by a 10% solution of saturated bromine water. Halogen compounds may also be employed to treat the rubber surfaces, as by a solution of sulphur chloride in carbon tetrachloride. The halogenating treatment may be applied by dissolving a halogenating agent or agents in the coagulant itself, as described above, or by separate treatment either before, or preferably after, the coagulation of the rubber solids in the latex composition has occurred. A heat sensitized latex, with or without addition of chemical coagulants may be conveniently employed and heated to coagulate the rubber solids in the latex, after which the treatment of the rubber surface may be accomplished. If desired, the freshly deposited latex film may be subjected to a sufficiently concentrated halogen treatment which will serve the double function of coagulating the rubber solids to form the rubber article, and of rendering the surface separable from rubber subsequently deposited thereon. Another alternative is to vary the order of procedure described above in such manner that the form is first dipped into the latex compound and then into the coagulant which contains the surface treating agent.

While halogens and halogen compounds have been illustrated as agents for rendering the surfaces of the rubber articles non-adherent and separable with respect to each other, a great variety of other agents will serve the same purpose. For example, oxidizing agents may be incorporated in the coagulant itself, or the coagulated rubber film may be subjected to the action of an oxidizing agent at any stage in the process before the deposition of the next succeeding rubber film.

The production of a rubber-separable surface on each rubber film and its coagulation may be simultaneously accomplished by treatment of the freshly deposited latex with suspensions of relatively water insoluble coagulant materials such as calcium sulphate, calcium hydroxide and zinc hydroxide. Upon drying, a thin protective coating of finely divided particles of the insoluble material is deposited on the outer surface of the latex thereby preventing adhesion between adjacent rubber layers. Mechanical prevention of adhesion between the adjacent rubber films or articles, in addition to the chemical methods exemplified above, may also be accomplished by the deposition of films of chemically inert and essentially water insoluble finely divided particles therebetween. Thus, after the formation of each rubber article, it may be coated or dusted with clay, diatomaceous earth, soapstone or bentonite etc. Upon drying of the suspension medium for these materials, the surface of each layer is rendered non-adhesive and separable from the subsequently deposited layer. The coating of the rubber surface by these materials may be accomplished in any desired manner, as, in some cases by incorporating them in the coagulant if a coagulant is used, or by depositing them on the rubber surface either before or after the surface has been dried.

The present invention may be employed not only to produce similar rubber sheets and similarly shaped rubber articles of uniform thickness, but may be so carried out as to produce beads, rims, or other reinforcing or thickened portions on the edge or other part of each article. Reinforcing portions may be produced by employing a form on the surface of which are provided reinforcement generating portions, such as a series of grooves. The latex is so deposited on the form with respect to the series of grooves that the first layer of rubber deposited therefrom engages and fills the first of the series of grooves nearest the continuous surface of the form. The second layer is, after the proper surface treatment of the first layer, dipped into or deposited with the latex so that the area of the rubber article formed therefrom is slightly larger than the area of the first, and so that the latex fills a groove of the series adjacent to the first groove. The succeeding articles are deposited in like manner, each engaging and filling a further groove of the series.

Figure 2:
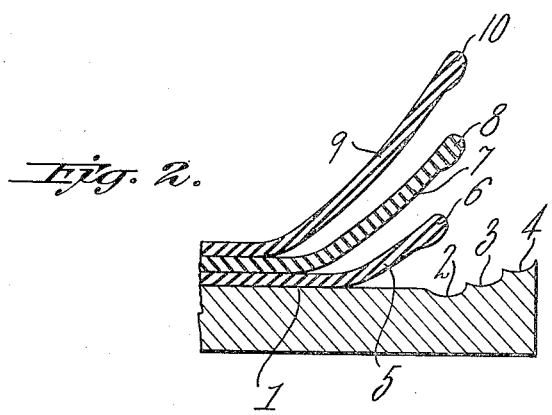
Figure 2 is an enlarged cross-sectional view of the same surface, showing partial removal of the rubber films therefrom.
Figure 3:
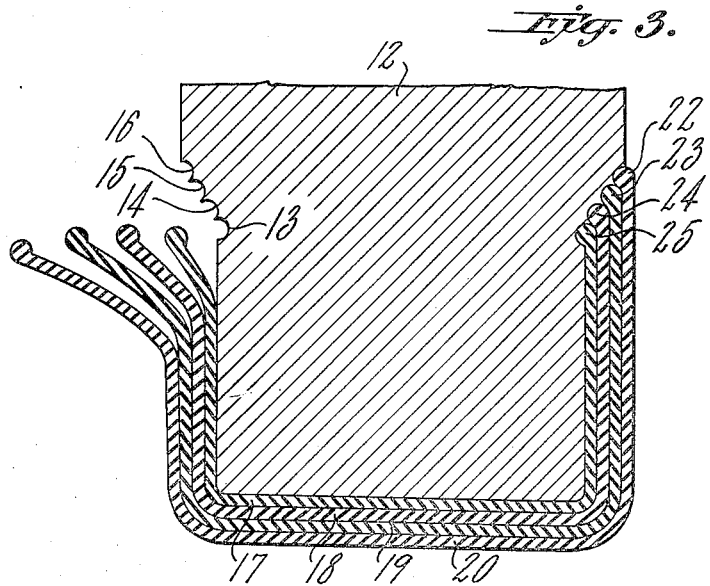
Figure 3 is a cross-sectional view of a dipping mold and of rubber articles formed thereon, removal of the articles from the form having been initiated.

Referring to the drawing, a flat deposition surface 1 is illustrated in Figs. 1 and 2 as carrying a series of grooves or concave portions 2, 3 and 4, which constitute the reinforcement generating surfaces for rubber deposited on the form or deposition surface. The groove 4 is elevated with respect to the groove 3 and the groove 3 elevated with respect to the groove 2 so that beads produced on the articles are similar to each other. The film 5 of rubber is deposited from latex, in a manner above described, onto the deposition surface 1 so as to fill the groove 2. The upper surface of the film 5 corresponds in contour to the lower surface and to the deposition surface 1, and by virtue of the surface tension in the originally deposited latex the extreme contour of the film corresponds to the contour of the groove 2 to fill the groove 2 and thus to form the reinforced portion or bead 6. The upper surface of the film 5 is treated in desired manner so that it is easily separable from a film 7 which is deposited thereon. The film 7 similarly carries a bead 8 which is formed by the flowing of the latex into the groove 3 adjacent to the groove 2. After halogenating, oxidizing or other treatment of the upper surface of the film 7, the film 9 is deposited thereon in such a manner that a bead 10 is formed on its edge corresponding in shape to the groove 4. Fig. 2 shows the stripping of the films 5, 7, 9 from the deposition surface 1 and from each other. The beads 6, 8 and 10 have been first respectively removed from the grooves 2, 3 and 4, after which the remainder of the articles may be separated from each other. Fig. 3 of the drawing shows in cross section a dipping form 12 having grooves 13, 14, 15 and 16 adjacently positioned around its upper portion. Rubber articles 17, 18, 19 and 20 have been successively deposited on the form and on each other in that order. By virtue of the grooves 13, 14, 15 and 16, respectively, beads 22, 23, 24 and 25 have been respectively formed on the edges of the articles 17, 18, 19 and 20. The left side of the drawing shows the series of articles in their incipient removal stage.

The terms "form" and "deposition surface" as used in the specification and in the appended claims refer to any desired surface upon which rubber articles of the desired shape are to be deposited from a latex composition and they may be made of any rigid, flexible, porous, or non-porous, material suitable for rubber forming processes well known in the art. If desired, the first latex film or layer may be adhered to the form, either by the use of an adhesive or by the omission of a surface treating step applied to the form. The reinforcement generating portions of the form may be of shapes and dimensions other than those illustrated, and may be arranged either adjacent to or separated from each other or may all be on the same level with respect to the deposition surface 1 shown in the drawing.

The term "latex" as employed in this specification and the appended claims designates broadly coagulable dispersions of elastic materials including artificial dispersions of rubber or of rubber-like materials, such as synthetic rubber, as well as natural latex, which may be in normal, concentrated, diluted or purified condition produced by methods well known in the art.

While certain present preferred embodiments of the invention have been shown and described, it is to be understood that it may be otherwise practiced within the spirit of the invention as will occur to those skilled in the art and within the scope of the appended claims.

Having thus described my invention what I claim and desire to protect by Letters Patent is:

1. The method of making a plurality of similarly shaped rubber articles which comprises depositing a plurality of rubber films from a rubber-containing fluid onto a deposition surface, rendering the exposed surface of each rubber film before the deposition of the next film to be deposited thereon easily separable from the surface of the rubber film to be deposited thereon, and removing said films from the deposition surface and from each other.

2. The method of producing a plurality of similarly shaped rubber articles which comprises the steps of rendering a deposition surface non-adherent to rubber deposited thereon, depositing a film of rubber from a rubber-containing liquid onto said deposition surface to form a rubber article, rendering the surface of said rubber article non-adherent to rubber deposited thereon from a rubber-containing liquid, depositing a film of rubber from a rubber-containing liquid onto the surface of said article to form a superimposed rubber article, forming the desired number of non-adherent super-imposed rubber articles in like manner, and removing said articles from the deposition surface and from each other.

3. The method of producing a plurality of similarly shaped rubber articles which comprises depositing a coagulant for rubber latex containing a halogenating agent onto a deposition surface, depositing a film of latex onto said coagulant and coagulating the rubber solids in said film to form a rubber article, depositing said coagulant onto the outer surface of said rubber article, depositing thereupon a film of latex and coagulating the rubber solids therein to form a superimposed rubber article easily removable therefrom, similarly producing the desired number of superimposed rubber articles, and removing said articles from the deposition surface and from each other.

4. The method of producing a plurality of similarly shaped rubber articles which comprises depositing a film of latex composition onto a deposition surface, applying to said film a coagulant containing a halogenating agent, thereby depositing the rubber solids in said film to form a rubber article having a surface easily removable from rubber deposited from latex thereon, forming the desired number of similar super-imposed easily separable rubber articles thereon in like manner, and removing said articles from the deposition surface and from each other.

5. The method of producing a plurality of similarly shaped rubber articles which comprises depositing a film of rubber from a latex composition onto a deposition surface to form a rubber article, treating the surface of said rubber article with a halogenating agent to render it easily separable from rubber deposited from latex thereon, depositing onto the surface of said rubber article a film of rubber from a latex composition to form a superimposed rubber article easily separable from said rubber article, similarly forming the desired number of easily separable rubber articles, and separating said rubber articles from the deposition surface and from each other.

6. The method of producing a plurality of similarly shaped rubber articles which comprises depositing a coagulant for rubber latex selected from the group consisting of calcium sulfate and calcium hydroxide onto a deposition surface, depositing a film of latex onto said coagulant and coagulating the rubber solids in said latex to form a rubber article easily separable from rubber deposited thereon from latex, depositing said coagulant onto the surface of said rubber article, depositing thereupon a film of latex and coagulating the rubber solids therein to form a superimposed rubber article, similarly producing the desired number of rubber articles, and removing said articles from the deposition surface and from each other.

7. The method of producing a plurality of similarly shaped rubber articles which comprises depositing a film of latex composition onto a deposition surface, applying to said film substantially water insoluble finely divided material which is a coagulant for rubber latex, thereby depositing the rubber solids in said film to form a rubber article having a surface easily removable from rubber deposited thereon from latex, forming the desired number of similar easily separable rubber articles thereon in like manner, and removing said articles from the deposition surface and from each other.

8. The method of producing a plurality of similarly shaped rubber articles which comprises depositing a film of latex composition onto a deposition surface, applying to said film a coagulant selected from the group consisting of calcium sulfate and calcium hydroxide, thereby depositing the rubber solids in said film to form a rubber article having a surface easily removable from rubber deposited from latex thereon, forming the desired number of similar easily separable rubber articles thereon in like manner, and removing said articles from the deposition surface and from each other.

9. In the method of making a plurality of similarly shaped rubber articles, the steps which comprise depositing a rubber film onto a deposition surface from a rubber-containing liquid to form a rubber article, depositing onto the surface of said rubber article a material which will render rubber deposited thereon from a rubber-containing liquid easily separable from said articles, forming the desired number of easily separable rubber articles in like manner, and removing said articles from the deposition surface and from each other.

10. The method of producing a plurality of similarly shaped rubber articles which comprises depositing a film of latex composition onto a deposition surface, applying to said film a coagulant containing finely divided water insoluble material selected from the group consisting of clay, ground soapstone, diatomaceous earth, chalk, and thereby depositing the rubber solids in said film to form a rubber article having a surface easily removable from rubber deposited from latex thereon, forming the desired number of similar superimposed easily separable rubber articles thereon in like manner, and removing said articles from the deposition surface and from each other.

11. The method of producing a plurality of similarly shaped rubber articles having reinforced edge portions which comprises depositing a film of rubber from a rubber-containing liquid onto a deposition surface having a series of reinforcement generating portions so that said rubber fills at least one of said portions, rendering the surface of said film easily separable from rubber deposited thereon from a rubber-containing liquid, depositing a film of rubber from a rubber-containing liquid upon the surface of said previously deposited film and into a reinforcement generating portion adjacent to said filled portion, forming the desired number of partially reinforced and easily separable rubber articles in like manner, and removing said articles from the deposition surface and from each other.

12. The method of producing a plurality of similarly shaped rubber articles which comprises depositing a coagulant from rubber latex onto a deposition surface, depositing a film of latex onto said coagulant and coagulating the rubber solids in said film to form a rubber article, depositing onto the surface of said article finely divided substantially water insoluble material to render the surface of said article easily removable from rubber deposited from latex thereon, forming the desired number of similar superimposed easily separable rubber articles thereon in like manner, and removing said articles from the deposition surface and from each other.

STEWART R. OGILBY.